Dec. 26, 1939.  D. B. DEWEY  2,184,833
SELF-CONTAINED AUTO COOLING UNIT
Filed Jan. 30, 1939   2 Sheets-Sheet 1
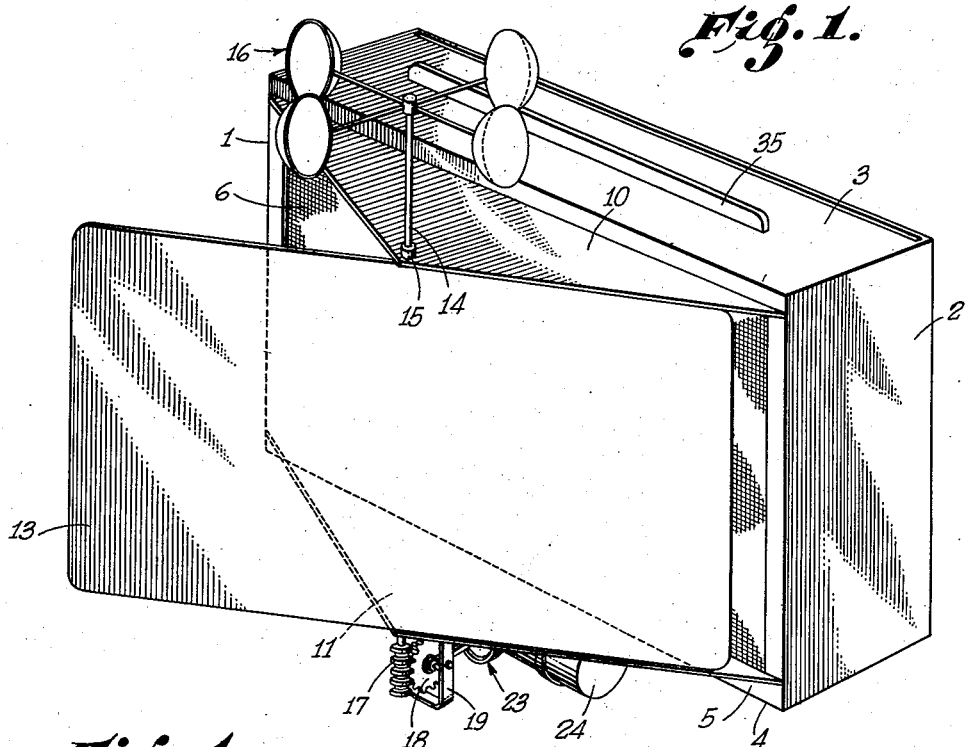
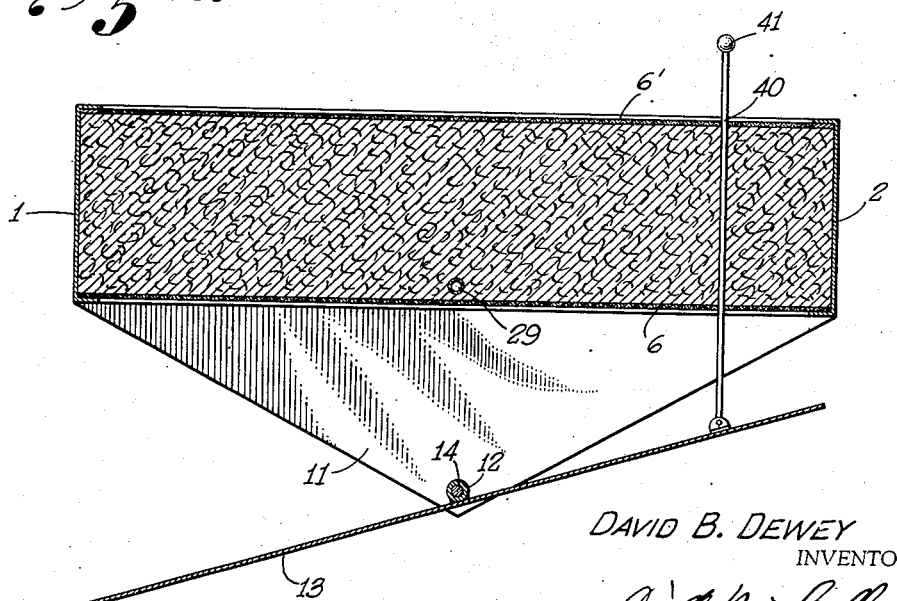
DAVID B. DEWEY
INVENTOR.
BY
ATTORNEY.

Dec. 26, 1939.  D. B. DEWEY  2,184,833
SELF-CONTAINED AUTO COOLING UNIT
Filed Jan. 30, 1939   2 Sheets-Sheet 2
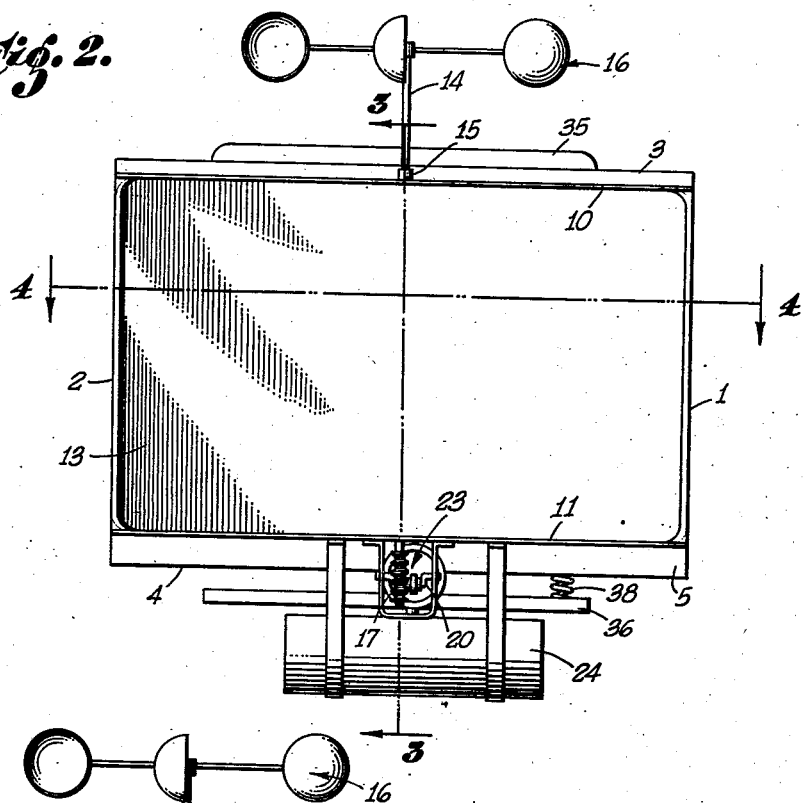
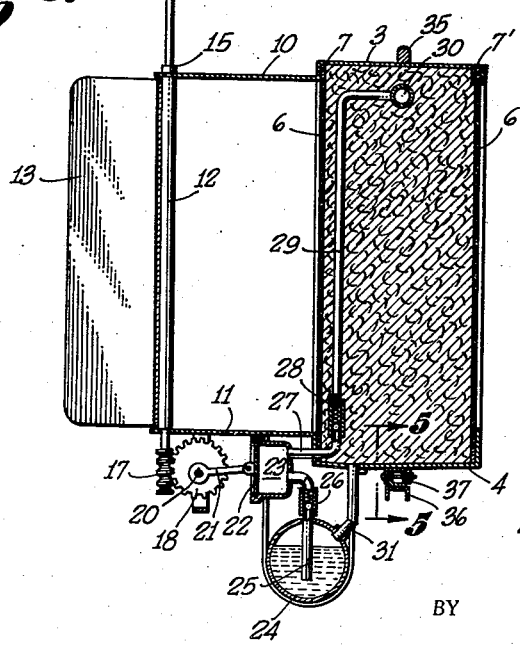
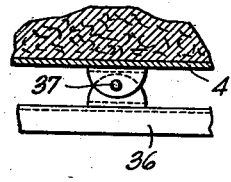
DAVID B. DEWEY
INVENTOR.
BY
ATTORNEY.

Patented Dec. 26, 1939

2,184,833

UNITED STATES PATENT OFFICE 2,184,833

SELF-CONTAINED AUTO COOLING UNIT

David Brainard Dewey, Pasadena, Calif.

Application January 30, 1939, Serial No. 253,587

4 Claims. (Cl. 261—36)

This invention pertains to a device for air conditioning or cooling the interiors of vehicles such as automobiles, and is particularly directed toward a form of cooling device which is simple in construction, self-contained, is free from motors requiring the supply of energy from an extraneous source, and which may be removably introduced into a window or other aperture in a vehicle.

Heretofore, vehicles traversing arid areas or those territories where high temperatures are encountered, have subjected their occupants to great discomfort. Numerous expedients have been attempted in order to facilitate cooling of the vehicles. In many instances the arid areas being traversed by the vehicle are not only areas of high atmospheric temperatures but in addition such areas are dusty and any attempt at ventilation of the vehicle subjected the occupants to the dust which often contains a high content of alkali and has injurious effects. Moreover, some of the expedients of the prior art involved the use of complicated, delicately constructed, bulky devices which did not withstand the vibration, jolting and rough treatment to which they were subjected.

The present invention is particularly directed toward a portable self-contained unit which does not require motive power supplied from an external source but which instead is operated by the movement of the vehicle, the movement of air past the vehicle acting as the motive force for circulating a suitable supply of liquid through a container, the air being then admitted into the vehicle through said container. The evaporation of the liquid, generally water, reduces the temperature of the air very appreciably, thus humidifying and cooling the air supplied to the occupants of the vehicle.

In its preferred form, the device of this invention may be removably attached in any window or aperture of the vehicle and since it has no well defined front or back, it may be introduced into the windows on either the right or left side of a vehicle. As will be made more evident from the detailed description given hereinafter, the device is inexpensive, simply constructed, durable and provided with means whereby it may be removably positioned in windows differing in width and in height.

An object of the present invention, therefore, is to disclose and provide a portable self-contained, air cooling unit adapted for use in vehicles such as automobiles and the like.

Another object is to provide an air cooling unit in which various elements have been arranged and combined in a most effective and simple manner.

A further object is to disclose and provide a portable self-contained air cooling unit in which a wind-actuated driving means is employed.

These and other objects, advantages, uses and adaptations of the invention will become apparent to those skilled in the art from the following description, reference being had to the appended drawings illustrating an exemplary form of the invention.

In such drawings:

Fig. 1 is a perspective view of a completed form of device.

Fig. 2 is a side view of the unit.

Fig. 3 is a vertical section taken along the plane III—III of Fig. 2.

Fig. 4 is a section taken along the horizontal plane IV—IV of Fig. 2.

Fig. 5 is a longitudinal section taken along the plane V—V of Fig. 3.

As most clearly shown in Fig. 1, the device may be introduced into any window of an automobile or other vehicle so that air entering said vehicle passes through the cooling unit of this invention. The unit itself may comprise end portions 1 and 2, a top portion 3 and a bottom 4. In one form of the invention the entire device has been about 14 inches wide, 12 inches high and 4 inches thick or deep. The bottom 4 is preferably in the form of a pan having longitudinal sides 5 of say 1 to 2 inches high. The remaining portion of the sides of the housing is preferably provided with foraminous members such as wire, mesh or other screen-like material, indicated at 6, mounted in a frame 7 (most clearly shown in Fig. 3). The frame 7' carrying the screen 6' on the rear or vehicle side of the device is preferably removable from the unit whereas the screen 6 on the front of the unit may be permanently attached thereto.

Extending outwardly from the top of the unit may be a web or supporting bracket, indicated at 10. A similar web or supporting bracket 11 may extend from near the bottom of the unit. As shown in Fig. 3, the web 11 may be a part of the sides 5 of the bottom portion of the entire unit. Extending between the ends of the brackets 10 and 11 is a tubular member 12 to which there is attached a wind deflector 13. Extending through the tubular member 12 and through brackets 10 and 11, is a shaft 14. A small collar 15 may be carried by the shaft above the bracket 10.

Mounted upon the outer end of the shaft 14 is a wind-actuated member such as, for example, the anemometer 16 which in the drawings comprises a plurality of hollow semi-spheres carried upon cross pieces fastened to the end of the shaft 14.

The bottom of the shaft 14 is provided with a worm gear 17 in engagement with a worm wheel 18 journaled in a strap bracket 19 depending from the lower bracket 11. Mounted upon the shaft of the worm wheel 18 is an eccentric 20 surrounded by an eccentric collar carried by an arm 21, said arm 21 being pivotally connected to a flexible diaphragm 22 forming one side of a diaphragm pump, generally indicated at 23.

Suspended from the bracket 11 is a reservoir 24 for liquid, said reservoir being connected as by means of line 25 with the diaphragm pump 23. The conduit 25 may be provided with a ball or other form of check valve, indicated at 26, whereby liquid from the reservoir may pass into the pump 23 while flow from the pump to the reservoir is stopped. The discharge of the diaphragm pump 23 is indicated at 27 and may also include a check valve 28. The discharge 27 from said pump may include a conduit 29 passing upwardly to the top of the unit and being connected to a manifold 30 provided with a plurality of perforations through which the liquid may be sprayed by said pump over the contents of the unit.

The housing of the device is preferably filled with a light weight porous material such as shavings or the like, whereby a large area is exposed, the water or other liquid supplied by the manifold 30 being thus distributed over the filler or other porous material within the housing so that the surface area of such material is thoroughly wetted and rendered available for effective cooling of the incoming air. Excess moisture supplied to the packing by the manifold 30 may collect in the lower pan-like bottom portion of the housing and drain therefrom as by means of line 31 into the reservoir 24.

The top portion 3 of the unit may be provided with an upstanding member 35 adapted to cooperate with the frame of the vehicle in which the unit is to be positioned. When the device is to be employed in automobiles, the upstanding member 35 is of a thickness capable of entering that space normally occupied by the upper edge of a window when it is in raised position. Ordinarily, the upper edges of movable windows in automobiles enter a recess formed in the upper frame and it is this recess with which the member 35 should be capable of cooperating.

The bottom 4 of the unit should be provided with additional means for cooperating with the windows of a vehicle. As shown in the drawings, the device may be provided with a pivoted channel-shaped member 36, this member being pivotally connected as at 37 with a downwardly extending lug carried by the bottom 4 of the device. A spring 38 may be provided near one end of the member 36. The channel member 36 may be lined with rubber or other resilient material and should be capable of engaging the upper edge of a window glass of the vehicle.

The deflector 13 may be adjustable about the vertical shaft 14. In order to facilitate positioning of the deflector 13, a member 40 may be attached to the deflector 13 and extend through the foraminous screens 6 and 6', the end of the member 40 being provided with a suitable knob or loop 41. In its simplest embodiment, the member 40 is provided with a section in the form of a plurality of serrations, such serrations being capable of engaging the edges of one of the perforations of the screen 6'.

In use the entire housing of the device is filled with shavings or other light weight porous material having large surface area and offering a low resistance to the passage of air therethrough. The receptacle or reservoir 24 is filled with water and the entire device may then be adjustably positioned in the window of a vehicle by lowering the normal glass window, introducing the member 35 into the recess formed in the upper portion of the frame of the window and then raising the glass window until its upper edge is embraced by the downwardly directed channel 36 pivotally connected to the bottom of the device. In the event the upper edge of the window is inclined, the channel member 36 will accommodate itself to such inclination by reason of its pivoted construction and by reason of the spring 38. The wind motor 16 will thus extend beyond the vehicle and the deflector 13 is adjusted by means of the knob or loop 41 so as to direct any air into and through the housing of the device. When the vehicle is driven, the wind motor causes rotation of the shaft 14, rotating the screw 17 and the worm wheel 18, rotation of the latter imparting a reciprocating action to the diaphragm 22 of the pump 23. When the pump is thus actuated, water is drawn from the reservoir 24 through the line 25 and discharged through the line 29 into the spray head or manifold 30.

If desired, more than one manifold 30 may be provided. Water is thus caused to be distributed over the entire porous packing of the device and air deflected by the deflector 13 passes through the moistened packing into the vehicle. Evaporation of the water reduces the temperature of the air, thereby supplying the interior of the vehicle with air at a materially lower temperature than atmospheric temperatures ambient to the vehicle.

It is to be noted that forward progress of the vehicle will thus automatically place the entire device in operation. The amount of air passing through the device may be easily adjusted by adjustably positioning the deflector 13. The use of the anemometer shown in Fig. 1 permits the device to be used either on the right or left side of the car, i. e., either end 1 or end 2 may face toward the front of the vehicle. In actual practice, in some of the desert areas of the Western States, such as those found in California, Nevada and Arizona, the temperature of the air entering the car and the temperatures within a vehicle may be maintained from 10° to 15° below the temperatures of the ambient air.

Instead of providing the device with an adjustable deflector, the outer surface or side of the device may be provided with a plurality of forwardly directed louvres followed by two or three rearwardly directed louvres. These louvres need extend but 2 or 3 inches from the surface of the device. After the air has entered the car it may be caused to be discharged either through a space immediately at the rear of the device (between the device and the window frame) or through a partially opened window in the rear of the vehicle. When an adjustable deflector of the type shown in the drawings is employed, a draft of any desired magnitude can be created through the vehicle by suitable adjustment of the deflector.

Although a specific form of device has been described, it is to be understood that all changes and modifications coming within the scope of the appended claims are embraced thereby.

I claim:

1. In a portable air cooling unit adapted for use in automobiles, the combination of a housing including imperforate top, end and bottom members; foraminous side walls in said housing, a wind-driven motor means carried by brackets extending from said housing, a diaphragm-type pump operatively connected to said wind-driven means, a water reservoir attached to and positioned below said housing, pipe means connecting said reservoir with said pump, and pipe means connecting the outlet from said pump with a header positioned within the upper section of said housing.

2. A portable self-contained air cooling unit adapted for use in vehicles and the like, comprising: a relatively shallow housing of rectangular side elevation, said housing including an upstanding member on the top of said housing adapted to fit in a recess in the window frame of a vehicle, and a downwardly directed channel member pivotally connected to the bottom of said housing and adapted to cooperate with the edge of a movable glass in said window; foraminous side walls in said housing; a body of porous material in the housing; an adjustable deflector carried by the housing for directing air therethrough; a wind-actuated driving means carried by one side of the housing and extending thereabove, a pump driven by said driving means, and pipe means connected to said pump for conveying water from said pump to the top of the porous material in said housing.

3. In a portable air cooling unit adapted for use in automobiles and the like, the combination of: a housing including imperforate top, end and bottom members, and foraminous side walls; an upstanding member on the top of said housing and adapted to fit into a recess in the window frame of a vehicle; a downwardly directed channel member connected to the bottom of said housing and adapted to cooperate with the top of a movable glass in said window; a body of porous material in the housing; a wind-actuated driving means carried by one side of the housing and extending thereabove, a pump driven by said driving means, and conduit means from said pump to the top of the porous material in said housing.

4. In a portable air cooling unit adapted for use in automobiles and the like, the combination of: a housing including imperforate top, end and bottom members, and foraminous side walls; an upstanding member on the top of said housing adapted to fit into a recess in the window frame of a vehicle; a downwardly directed channel member connected to the bottom of said housing and adapted to cooperate with the top of a movable glass in said window; a water reservoir below and to one side of said housing; a wind-driven motor means carried by brackets extending from one side of said housing; a body of porous material in said housing; a pump driven by said motor means and operably associated with said reservoir; and conduit means from said pump to the top of the porous material in said housing.

DAVID BRAINARD DEWEY.